US008971199B2

(12) United States Patent
Izzo et al.

(10) Patent No.: US 8,971,199 B2
(45) Date of Patent: Mar. 3, 2015

(54) APPARATUS AND METHOD FOR SELECTING SERVICE QUALITY METRICS FOR MANAGED SERVICES QUALITY ASSURANCE

(75) Inventors: Steven J. Izzo, Chatham, NJ (US); Janet Nici, Holmdel, NJ (US); Vanita Katkar, Whitehouse Station, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 302 days.

(21) Appl. No.: 13/469,503

(22) Filed: May 11, 2012

(65) Prior Publication Data

US 2013/0301431 A1 Nov. 14, 2013

(51) Int. Cl.
*H04L 12/26* (2006.01)
(52) U.S. Cl.
USPC .......................................... 370/252; 370/230
(58) Field of Classification Search
USPC ............... 370/230, 241, 241.1, 244, 252, 254
See application file for complete search history.

(56) References Cited

U.S. PATENT DOCUMENTS

| | | | |
|---|---|---|---|
| 2005/0181835 A1* | 8/2005 | Lau et al. | 455/567 |
| 2006/0229931 A1* | 10/2006 | Fligler et al. | 705/10 |
| 2010/0054149 A1* | 3/2010 | Healy et al. | 370/252 |
| 2012/0254414 A1* | 10/2012 | Scarpelli | 709/224 |
| 2013/0067109 A1* | 3/2013 | Dong et al. | 709/231 |
| 2013/0163438 A1* | 6/2013 | Wilkinson | 370/242 |
| 2013/0166730 A1* | 6/2013 | Wilkinson | 709/224 |
| 2013/0262656 A1* | 10/2013 | Cao et al. | 709/224 |

* cited by examiner

*Primary Examiner* — Kwang B Yao
*Assistant Examiner* — Nguyen Ngo
(74) *Attorney, Agent, or Firm* — Wall & Tong LLP

(57) ABSTRACT

A service quality metrics selection capability is presented. The selection of service quality metrics for a service may include selecting a plurality of candidate service quality metrics for a service from a set of available service quality metrics, associating each of the candidate service quality metrics with a respective one of a plurality of user experience categories and a respective one of a plurality of service user functions of the service, and selecting at least a portion of the candidate service quality metrics to be associated with the service. The selection of candidate service quality metrics to be associated with the service produces a set of selected service quality metrics for the service, which may be used to manage service quality assurance for the service.

17 Claims, 8 Drawing Sheets

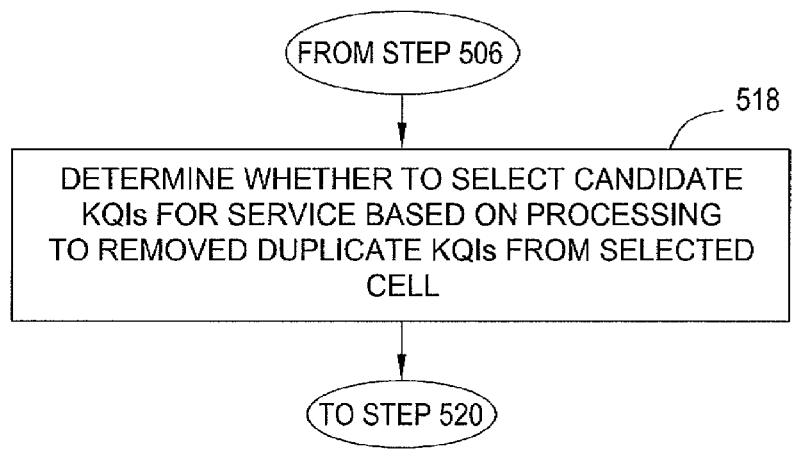
FIG. 5
(CONTINUED)

US 8,971,199 B2

APPARATUS AND METHOD FOR SELECTING SERVICE QUALITY METRICS FOR MANAGED SERVICES QUALITY ASSURANCE

TECHNICAL FIELD

The invention relates generally to communication systems and, more specifically but not exclusively, to managed services quality assurance within communication systems.

BACKGROUND

A Service Provider (SP), such as a communications service provider, often contracts with a Managed Service Provider (MSP) in order to have the MSP manage one or more service offerings of the SP. When contracting to deliver "service assurance" based on "service quality" as experienced by the end users, the MSP and SP typically agree to specific service quality metrics, which may include Key Quality Indicators (KQIs) and/or other types of service quality metrics. However, given that many communication networks and associated managed equipment are capable of producing large numbers of service quality measures (at least some of which may be defined differently when based on similar concepts), it is often quite difficult for the MSP and the SP to select relevant service quality metrics from the large set of available service quality metrics.

SUMMARY

Various deficiencies in the prior art are addressed by embodiments for selecting service quality metrics for a service.

In one embodiment, an apparatus includes a processor and a memory communicatively connected to the processor, where the processor is configured to select one or more candidate service quality metrics for a service from a set of available service quality metrics, associate each of the candidate service quality metrics with one of a plurality of user experience categories and one of a plurality of service user functions of the service, and select at least a portion of the candidate service quality metrics for association with the service.

In one embodiment, a computer-readable storage medium stores instructions which, when executed by a computer, cause the computer to perform a method that includes selecting one or more candidate service quality metrics for a service from a set of available service quality metrics, associating each of the candidate service quality metrics with one of a plurality of respective user experience categories and one of a plurality of service user functions of the service, and selecting at least a portion of the candidate service quality metrics for association with the service.

In one embodiment, a method includes using at least one processor for selecting one or more candidate service quality metrics for a service from a set of available service quality metrics, associating each of the candidate service quality metrics with one of a plurality of user experience categories and one of a plurality of service user functions of the service, and selecting at least a portion of the candidate service quality metrics for association with the service.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
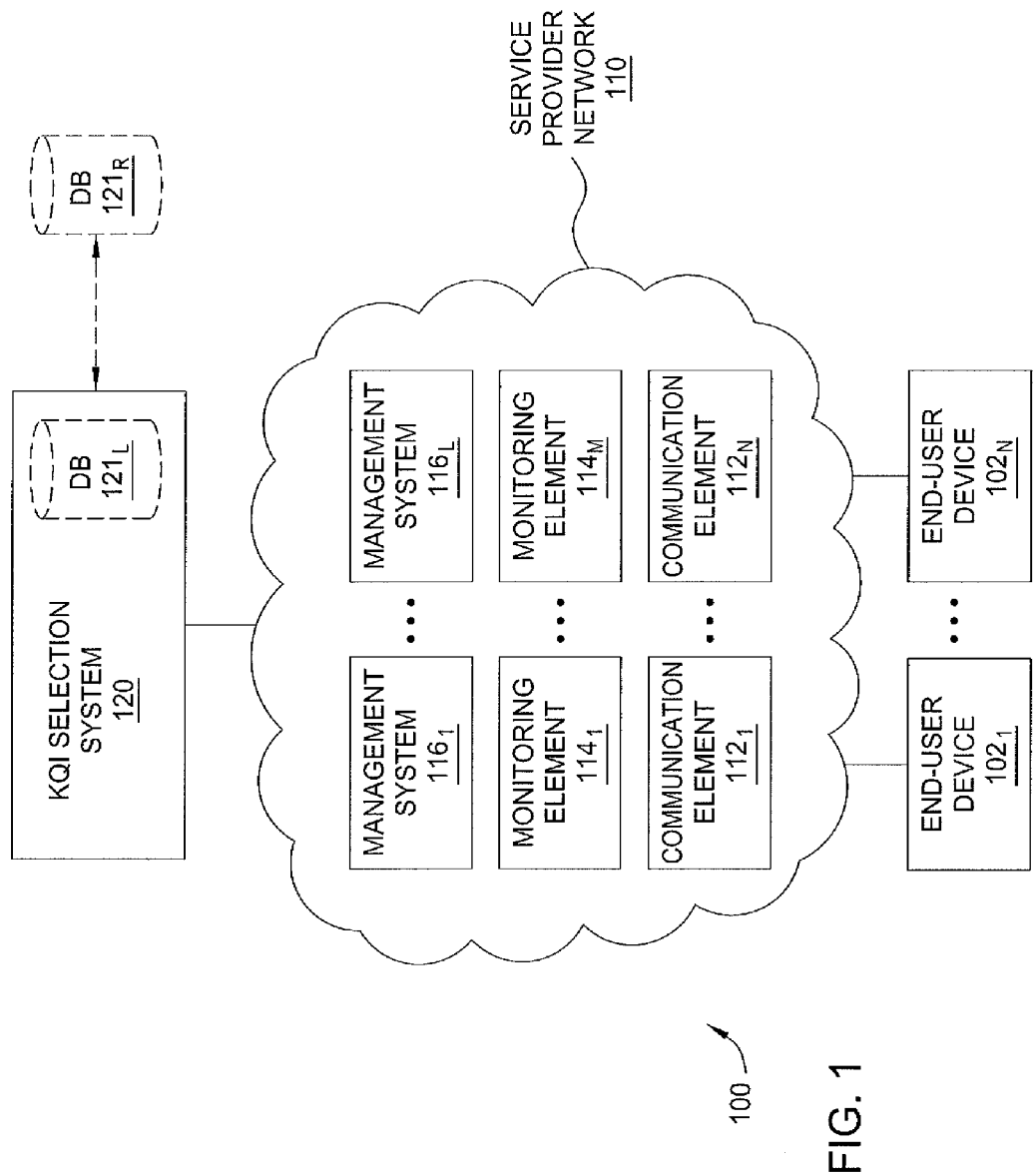
FIG. 1 depicts a high-level block diagram of a communication system.

In general, a service quality metrics selection capability is depicted and described herein, although various other capabilities also may be presented herein.

In at least some embodiments, the service quality metrics selection capability provides a process for rapidly selecting, from a relatively large set of potential service quality metrics, a set of service quality metrics appropriate for a particular service offering (or, more generally, service) of a Service Provider (SP). In at least some embodiments, the appropriate service quality metrics for the particular service may include service quality metrics that are relevant to the service experience of the end user using the service of the SP. In at least some embodiments, selection of the set of service quality metrics for the service may utilize multiple reasoning techniques which may make use of keywords, rules, case-based logic, or the like, as well as various combinations thereof.

It is noted that the service quality metrics selected for a service of an SP may be selected for use by the SP in managing the service, for use by a Managed Service Provider (MSP) in managing the service for the SP where the SP contracts with the MSP to have the MSP deliver "service assurance" for the service based on "service quality" as experienced by end users using the service, or the like, as well as various combinations thereof.

In at least some embodiments, in which the SP contracts with an MSP, the service quality metrics selection capability facilitates agreement between the SP and the MSP with respect to specific service quality metrics when the SP contracts with the MSP to have the MSP deliver "service assurance" for the service based on "service quality" as experienced by end-users.

In at least some embodiments, in which the SP contracts with an MSP, the service quality metrics selection capability improves the ability of the MSP to control cost and reduce variation and risk. This is advantageous, given that managing the delivery of end-user services along with underlying network performance, to meet specific service quality metrics agreed to by the MSP and the SP, is typically one of the main factors driving MSP costs and risk of failure by the MSP to meet service level contract agreements with SP.

In at least some embodiments, in which the SP contracts with an MSP, the appropriate service quality metrics for the particular service may include service quality metrics that are technically feasible for the MSP to manage on behalf of the SP within a given price guarantee.

It is noted that, although primarily depicted and described herein with respect to embodiments in which the service quality metrics are Key Quality Indicators (KQIs), the service quality metrics also or alternatively may include one or more other types of metrics suitable for use in measuring service quality.

It is noted that, although primarily depicted and described herein with respect to embodiments in which the service quality metrics selection capability is configured to select service quality metrics associated with a service of a SP providing services in a communication network, the service quality metrics selection capability also may be configured to select service quality metrics associated with a service of a SP providing services within various other types of environments or contexts.

FIG. 1 depicts a high-level block diagram of a communication system. The communication system 100 includes a plurality of end-user devices (EUDs) $102_1$-$102_N$ (collectively, EUDs 102), a service provider network (SPN) 110, and a KQI Selection System (KSS) 120. The EUDs 102 access SPN 110, thereby enabling EUDs 102 to utilize services available from SPN 110. The KSS 120 supports selection of KQIs for services supported by SPN 110.

The EUDs 102 may include any end user devices which may access SPN 110. For example, EUDs 102 may include wireline phones, cellular phones, smartphones, desktop computers, laptop computers, tablet computers, or the like. The EUDs 102 are used by end users, who utilize the services available via SPN 110. The end users may have different expectations and experiences when using the services available via SPN 110.

The SPN 110 may include any type of communication network configured to provide services to EUDs 102 (e.g., a wireline communication network, a wireless communication network, or the like, as well as various combinations thereof).

The SPN 110 includes a plurality of communication elements $112_1$-$112_N$ (collectively, communication elements 112), a plurality of monitoring elements $114_1$-$114_M$ (collectively, monitoring elements 114), and a plurality of management systems $116_1$-$116_L$ (collectively, management systems 116).

The communication elements 112 include elements configured to support signaling and bearer traffic within SPN 110. For example, the communication elements 112 may include access nodes (e.g., wireline access nodes, wireless access nodes, or the like), routers, switches, servers, or the like, as well as various combinations thereof.

The monitoring elements 114 include elements configured to perform various types of monitoring within SPN 110 (e.g., network monitoring, service monitoring, or the like, as well as various combinations thereof). The monitoring elements 114 may monitor the performance of communication elements 112, aspects of services provided via a communication elements 112, where the like, as well as various combinations thereof. The monitoring elements 114 may provide collected monitoring information to management systems 116. For example, monitoring elements 114 may include monitoring systems (e.g., network monitoring systems, service monitoring systems, or the like, as well as various combinations thereof), probes, or the like, as well as various combinations thereof.

The management systems 116 include systems configured to perform various management functions within SPN 110. The management systems 116 may communicate with various elements for purposes of performing management functions within SPN 110 (e.g., communication elements 112, monitoring elements 114, or the like, as well as various combinations thereof). For example, management systems 116 may include provisioning systems, element management systems, network management systems, service management systems, or the like, as well as various combinations thereof.

The SPN 110 is configured to provide services to EUDs 102. The services may include any suitable types of services which may be provided by a service provider network (e.g., fixed voice calling, mobile voice calling, mobile Internet, mobile web browsing, smartphone email, or the like, as well as various combinations thereof). In one embodiment, a service may be defined by the set of service elements that enables delivery of the service to the end user. In one such embodiment, the service elements used to define services may include one or more of a user function, an application, a network, a device, or the like, as well as various combinations thereof. It is noted that few or more service elements may be used to define a service provided to EUDs 102 by SPN 110.

The services of SPN 110 may be managed in a number of ways. For example, the services of SPN 110 may be managed by the SP, managed by an MSP for the SP, or the like, as well as various combinations thereof. The management of services of SPN 110 includes delivery of "service assurance" based on "service quality" as experienced by the end users of EUDs 102, which may be measured using KQIs. For example, when a service of SPN 110 is being managed by the SP, the SP may set specific goals for certain KQIs in order to deliver "service assurance" based on "service quality" as experienced by end users of EUDs 102 (which may include specific goals for certain KQIs as set by the SP). Similarly, for example, when a service of SPN 110 is being managed by an MSP on behalf of the SP of SPN 110, the SP may contract with the MSP to have the MSP deliver "service assurance" based on "service quality" as experienced by end users of EUDs 102 (which may include specific goals for certain KQIs agreed to by the MSP and the SP). As described herein, however, there are typically very large numbers of different KQIs available for use in evaluating delivery of "service assurance" based on "service quality" as experienced by end users. Thus, it is often necessary or desirable to select, from among the available KQIs, a subset of KQIs that is to be used to evaluate management of a particular service of SPN 110.

The KSS 120 is configured to perform various functions of the service quality metrics selection capability. The KSS 120 is configured to select KQIs for a service. The KSS 120 is configured to pre-process input source data to produce processed source data for use in selecting a set of KQIs for a service. The KSS 120 is configured to select a set of KQIs for a service from a set of available KQIs based on the processed source data, thereby producing a mapping between the service and the set of KQIs selected for the service. The KSS 120 may have access to one or more databases (e.g., internally and/or externally, such as a local DB $121_L$ and a remote DB $121_R$ depicted in FIG. 1) configured to store information associated with selection of KQIs for services (e.g., input source information, pre-processed source information, intermediate results information produced during the process(es) for selecting KQIs for services, final KQI selection information for services, or the like, as well as various combinations thereof). The KSS 120 may be configured to provide other functions in support of the service quality metrics selection capability.

The KSS 120 may be implemented in any suitable manner. In one embodiment, as depicted in FIG. 1 for example, KSS 120 is implemented as a standalone system configured to provide functions of the service quality metrics selection capability. It is noted that, although omitted from FIG. 1 for purposes of clarity, KSS 120 also could be implemented by providing the functions of the service quality metrics selection capability on an existing system (e.g., an existing Management System that is part of SPN 110 or otherwise associated with SPN 110, or the like), distributing the functions of the service quality metrics selection capability across multiple existing systems, distributing the functions of the service quality metrics selection capability across one or more new systems and one or more existing systems, or the like.

The operation of KSS 120 in performing functions associated with selection of KQIs for services may be better understood by way of reference to FIGS. 2-5.

Figure 2:
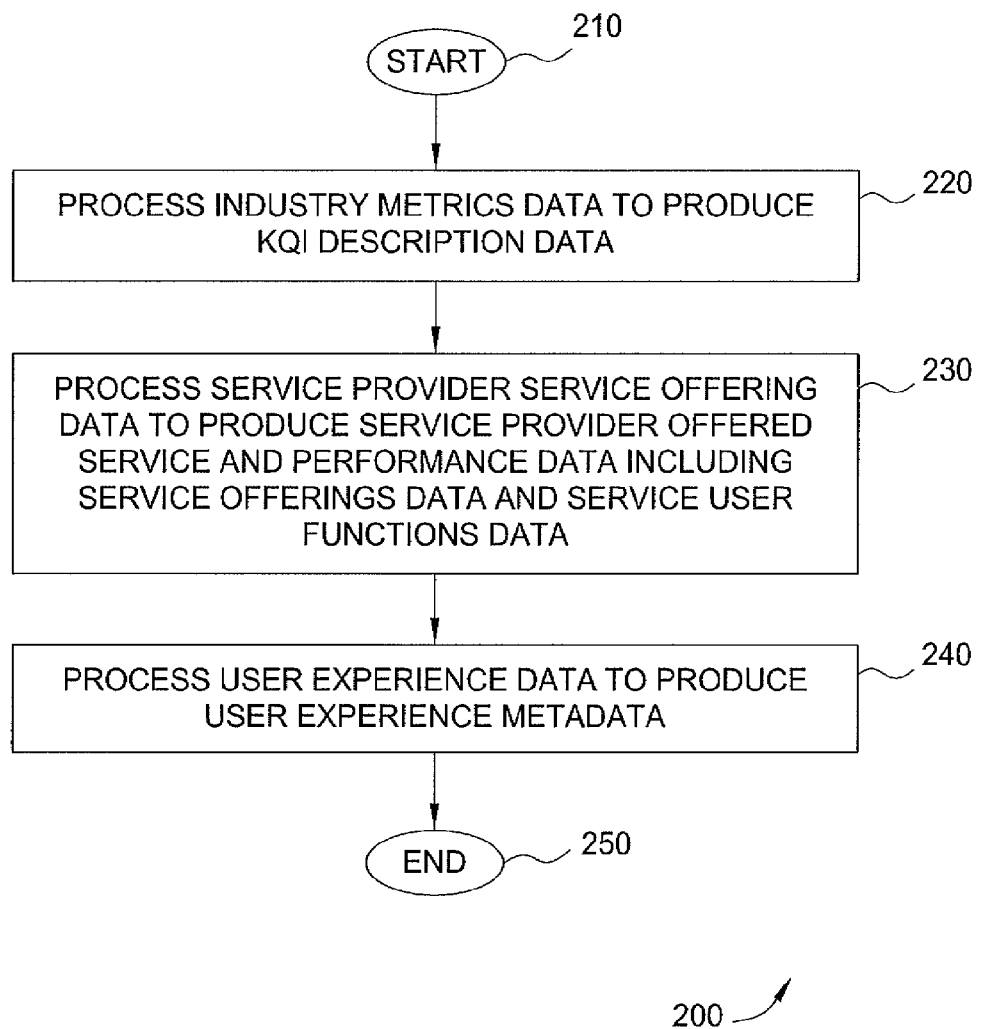
FIG. 2 depicts one embodiment of a method for pre-processing input source data to produce processed source data for use in selecting a set of KQIs for a service.

FIG. 2 depicts one embodiment of a method for pre-processing input source data to produce processed source data for use in selecting a set of KQIs for a service. Although depicted and described as being performed serially, at least a portion of the steps of method 200 may be performed contemporaneously and/or in a different order than presented in FIG. 2.

At step 210, method 200 begins.

At step 220, Industry Metrics data is processed to produce KQI description data. The processing of Industry Metrics data to produce the KQI description data prepares the Industry Metrics data for use in selecting sets of KQIs for services. It is noted that since the service quality metrics also are referred to herein as KQIs, the KQI description data also may be referred to herein as service quality metrics description data.

The Industry Metrics data includes descriptions of KQIs. The descriptions of the KQIs may be provided in various formats, which may include varying levels of structure, context, and detail information. The descriptions of the KQIs may be available from various sources. The telecommunications industry produces a large number of documents including Industry Metrics data describing KQIs. For example, such documents may be produced by Standards Bodies, Industry Forums, Solution/Product Vendors, Industry Research Publications, Service Providers, or the like, as well as various combinations thereof.

Table 1 depicts two examples of Industry Metrics data describing two different KQIs.

TABLE 1

| | |
|---|---|
| KQI Example 1 | E-mail Upload Data Transfer Time<br>Abstract Definition: The e-mail data transfer time describes the time period from the start to the end of the complete transfer of e-mail content.<br>Abstract Equation: E -mail Upload Data Transfer Time = (t successful data transfer - t successfully started data transfer)[s]<br>Trigger Points: Event from abstract equation: Successfully started data transfer<br>Trigger point from customer's point of view Start: E-mail upload starts<br>Technical description/protocol part Start: SMTP: "MAIL FROM" sent by the client.<br>Event from abstract equation: Successful data transfer<br>Trigger point from customer's point of view Stop: E-mail upload successfully completed A-party.<br>Technical description/protocol part Stop: SMTP: Reply "250 message accepted" received by the client. |
| KQI Example 2 | Telephony Service Non-Accessibility [%]<br>Abstract Definition: The telephony service non-accessibility denotes the probability that the end-user cannot access the mobile telephony service when requested if it is offered by display of the network indicator on the UE. NOTE: Due to network problems and despite B-party being not busy (see preconditions for measurement), it may even be possible for the A-party to receive a busy or not reachable signal. In this case, since no ALERTING message will be sent, the test sample will be treated as a failure.<br>Abstract Equation: Telephony Service Non - Accessibility [%] = (unsuccessful call attempts/all call attempts × 100)<br>Trigger Points: |

TABLE 1-continued

Event from abstract equation: Call attempt
Trigger point from user's point of view: Start: Push Send button.
Technical description/protocol part: Start: Layer 3 (RR): The "CHANNEL REQUEST" message is sent over the RACH.
Event from abstract equation: Successful call attempt
Trigger point from user's point of view: Stop: Alerting tone is heard by the A-party AND B-party rings.
Technical description/protocol part: Stop: Layer 3 (CC): The "ALERTING" message is passed: 1. from the B-party to the MSC (uplink) AND 2. from the MSC to the A-party (downlink) to indicate that the B-party rings.

The Industry Metrics data is processed to normalize and format the Industry Metrics data using a well-formed data structure, thereby producing the KQI description data. The processing of the Industry Metrics data may be performed in any suitable manner (e.g., using one or more text parsing techniques, one or more text formatting techniques, or the like, as well as various combinations thereof).

The KQI description data produced via processing of the Industry Metrics data includes KQI descriptions of available KQIs.

The KQI description of an available KQI may include KQI description information suitable for use in describing the available KQI. In one embodiment, for example, the KQI description information of an available KQI may include a KQI Identifier attribute, a KQI Name attribute, a Service Name attribute (e.g., including one or more Service Names of services to which the KQI applies), a KQI Formula attribute (e.g., including one or more formulas for the KQI), a Measurement Units attribute (e.g., including one or more measurement units for the KQI), an Expected Values attribute (e.g., including one or more expected values for the KQI), a User Experience Keywords attribute (e.g., including one or more user experience keywords), and an Industry Reference attribute. It is noted that the KQI description of an available KQI may include less or more (as well as different) KQI description information.

The KQI descriptions of the available KQIs may be provided in any suitable format, which may be defined using any suitable numbers/types of data elements. In one embodiment, the KQI descriptions of the available KQIs are defined using a data structure that has specific numbers/types of data elements suitable for use in storing KQI description information for the available KQIs.

Table 2A depicts an exemplary data structure for a KQI description of an available KQI. It is noted that, although primarily depicted and described as including specific numbers, types, and arrangements of data elements, the data structure used for a KQI description of an available KQI may include fewer or more data elements (which also may include other types of data elements) and/or may be arranged in a different manner.

TABLE 2A

KQI Description Information

| Data Element | Description of Data Element |
|---|---|
| KQI ID | unique identifier for KQI (e.g., assigned during pre-processing) |
| KQI Name | name of KQI |
| Service Name | name of service for which KQI applies |
| KQI Formula | formula (e.g., variables/operations) to calculate KQI |
| Measurement Units | units in which KQI is measured (e.g., percent, hours, etc.) |

TABLE 2A-continued

KQI Description Information

| Data Element | Description of Data Element |
| --- | --- |
| Expected Value(s) | industry expected values for KQI, where available |
| User Experience Keywords | keywords describing relationship of KQI to end user experience |
| Industry Reference | source of KQI |

Table 2B depicts two exemplary KQI descriptions of two available KQIs formatted in accordance with the exemplary data structure of Table 2A.

TABLE 2B

| Data Element | Example 1 | Example 2 |
| --- | --- | --- |
| KQI ID | 19 | 20 |
| KQI Name | E-Mail Send Success Rate | E-Mail Transfer Time |
| Service Name | E-Mail | E-Mail |
| KQI Formula | Email Send Success Rate = (unsuccessful send attempts/all send attempts × 100) | E-mail Transfer Time = (t email send − t email received) |
| Measurement Units | % | Minutes |
| Expected Value(s) | 99.0 | 15 |
| User Experience Keywords | Send Email, Send Message, Successfully Send . . . | Delivery Time, Timestamp . . . |
| Industry Reference | Standard | Standard |

The KQI descriptions of the available KQIs may be maintained in any suitable manner. In one embodiment, for example, the KQI descriptions of the available KQIs may be stored in a database (e.g., using one or more database tables) accessible for use in selecting KQIs for a service.

At step 230, service provider service offering data is processed to produce service provider offered service and performance data. The processing of service provider service offering data from the SP to produce the service provider offered service and performance data prepares the service provider service offering data from the SP for use in selecting sets of KQIs for services.

The service provider service offering data may be obtained from the SP as part of the overall business discussions about selecting KQIs for a service to be managed. The service provider service offering data may be collected on a customer by customer basis. It is noted that, although requirements are specified for creation of the service provider service offering data, the service provider service offering data is processed in order to apply uniformity across the service provider service offering data (e.g., in terms of formatting of the service offering data).

The service provider offered service and performance data includes service offerings data and service user functions data.

The service offerings data describes services offered by the SP. The descriptions of the services may be provided in any suitable format, which may be defined using any suitable numbers/types of data elements. In one embodiment, the descriptions of the services are defined using a data structure that has specific numbers/types of data elements suitable for use in storing description information for the services.

Table 3A depicts an exemplary data structure for describing a service offered by the SP. Although primarily depicted and described as including specific numbers, types, and arrangements of data elements, it is noted that the data structure used for describing a service offered by the SP may include fewer or more data elements (which also may include other types of data elements) and/or may be arranged in a different manner.

TABLE 3A

Service Provider Service Offering Data

| Data Element | Description |
| --- | --- |
| Service Provider ID | unique identifier of Service Provider (e.g., assigned during pre-processing) |
| Service Provider Name | name of Service Provider |
| Service ID | unique identifier for service (e.g., assigned during pre-processing) |
| Service Name | name of service |
| Service Type | type of service |
| Service Sub-Type | sub-type of service |
| Market Segment | market segment for which service is offered |
| Required Device Type | type of device that must be used for service (if applicable) |
| Required Device Supplier | supplier of required device (if applicable) |
| Required Device Model | model of required device (if applicable) |
| Required Application SW | software required for Service (if applicable) |
| Required SW Supplier | supplier of required software (if applicable) |

Table 3B depicts an exemplary service description (for an Email Service for a Smartphone Provider denoted as Smartphone Provider 1) formatted in accordance with the exemplary data structure of Table 3A.

TABLE 3B

| Data Element | Example |
| --- | --- |
| Service Provider ID | 1024 |
| Service Provider Name | Service Provider 1 |
| Service ID | 301 |
| Service Name | Smartphone Provider 1 Email |
| Service Type | Messaging |
| Service Sub-Type | Email |
| Market Segment | Consumer |
| Required Device Type | Smartphone |
| Required Device Supplier | Smartphone Provider 1 |
| Required Device Model | Smartphone Version 1 |
| Required Application SW | Email |
| Required SW Supplier | Smartphone Provider 1 |

The service user functions data describes service user functions. The description of a service user function includes, for a given service, a list of user functions associated with the given service. The descriptions of the service user functions may be provided in any suitable format, which may be defined using any suitable numbers/types of data elements. In one embodiment, the descriptions of the service user functions are defined using a data structure that has specific numbers/types of data elements suitable for use in storing description information for the service user functions.

Table 4A depicts an exemplary data structure for describing a service user function. Although primarily depicted and described as including specific numbers, types, and arrangements of data elements, it is noted that the data structure used for describing a service user function may include fewer or more data elements (which may include other types of data elements) and/or may be arranged in a different manner.

TABLE 4A

Service User Functions Data

| Data Element | Description |
| --- | --- |
| Service ID | unique identifier for the Service (e.g., assigned during pre-processing) |
| Service Name | name of service being offered |
| Service User Function | user function associated with service |
| User Function Execution Domain Keywords | keyword(s) associated with executing the service user function |
| User Function Performance Units | measurement unit associated with performance metric (e.g., percent, minutes, etc.) |
| User Function Performance Expected Value | expected value for the performance of service user function |

Table 4B depicts exemplary service user function descriptions (for an Email Service for a Smartphone Provider denoted as Smartphone Provider 1) formatted in accordance with the exemplary data structure of Table 4A. It is noted that the Service ID data element (value "301") is omitted for purposes of clarity in depicting the other data elements.

TABLE 4B

| Service Name | Service User Function | User Function Execution Domain Keywords | User Function Performance Units | User Function Performance Expected Value |
| --- | --- | --- | --- | --- |
| Smartphone Provider 1 Email | Write New Message | client software, key pad, touch screen, device, save message, add contact, | Percent | 99.9 |
| Smartphone Provider 1 Email | Send Message | email protocol, email server, email application, transmit, transmission, upload | Percent Seconds | 99.9 15 |
| Smartphone Provider 1 Email | Receive Notification of Message Sent | indicator, icon, application response | Percent | 99.9 |
| Smartphone Provider 1 Email | Receive Email | email transfer, receiving party, receipt, application processing time, download | Minutes | 15 |
| Smartphone Provider 1 Email | View Received Email | device, display, view attachment | Percent | 99.9 |

With respect to the service user functions data, it is noted that the Service User Function data element and the User Function Execution Domain Keywords data element may be used to select KQIs, whereas the remaining data elements may be used to provide context for the selected KQIs when used in a Service Level Agreement (SLA).

The service provider offered service and performance data may be maintained in any suitable manner. In one embodiment, the service provider offered service and performance data is maintained using one or more databases. In one embodiment, the service offering data is maintained in a first database table (or set of database tables) and the service user functions data is maintained in a second database table (or set of database tables), where the first and second database tables may be part of the same database or different databases.

At step 240, user experience data is processed to produce user experience metadata.

The user experience data includes a list of user experience categories and a set of user experience keywords.

The user experience categories include an Accessibility category, a Responsiveness category, an Integrity category, and a Retainability category. It is noted that fewer or more user experience categories may be defined and used. The user experience keywords may be identified from KQI descriptions of the available KQIs in the KQI description data. The processing of the user experience data includes mapping of the user experience keywords in the KQI description data to the user experience categories.

The user experience metadata includes mappings of user experience keywords to the user experience categories (e.g., each user experience keyword in the KQI description data is mapped to one of the user experience categories). For example, user experience keywords associated with the Accessibility category may include success, accessibility, non-accessibility, or the like, as well as various combinations thereof. For example, user experience keywords associated with the Responsiveness category may include time, delay, duration, or the like, as well as various combinations thereof. For example, user experience keywords associated with the Integrity category may include speech, voice, audio, video, text, image, picture, multimedia, or the like, as well as various combinations thereof. For example, user experience keywords associated with the Retainability category may include cutoff, termination, connection loss, or the like, as well as various combinations thereof. It is noted that each of the user experience categories may include various other user experience keywords.

Table 5 depicts exemplary user experience metadata illustrating mappings of user experience categories to user experience keywords.

TABLE 5

User Experience Metadata

| User Experience Keywords | User Experience Category |
| --- | --- |
| success, accessibility, non-accessibility, . . . | Accessibility |
| time, delay, duration, . . . | Responsiveness |
| speech, voice, audio, video, text, image, picture, multimedia, . . . | Integrity |
| cutoff, termination, connection loss . . . | Retainability |

In one embodiment, the user experience metadata may be enhanced over time in order to improve performance. For example, user experience metadata maintenance rules may provide a mechanism for handling user experience keywords that are discovered in the KQI description data but which are not present in the user experience metadata table to be reported for enabling the user experience keywords to be added to the user experience metadata.

At step 250, method 200 ends.

It is noted that the data elements depicted and described with respect to method 200 of FIG. 2 also may be referred to herein as fields (e.g., fields of a database table).

Figure 3:
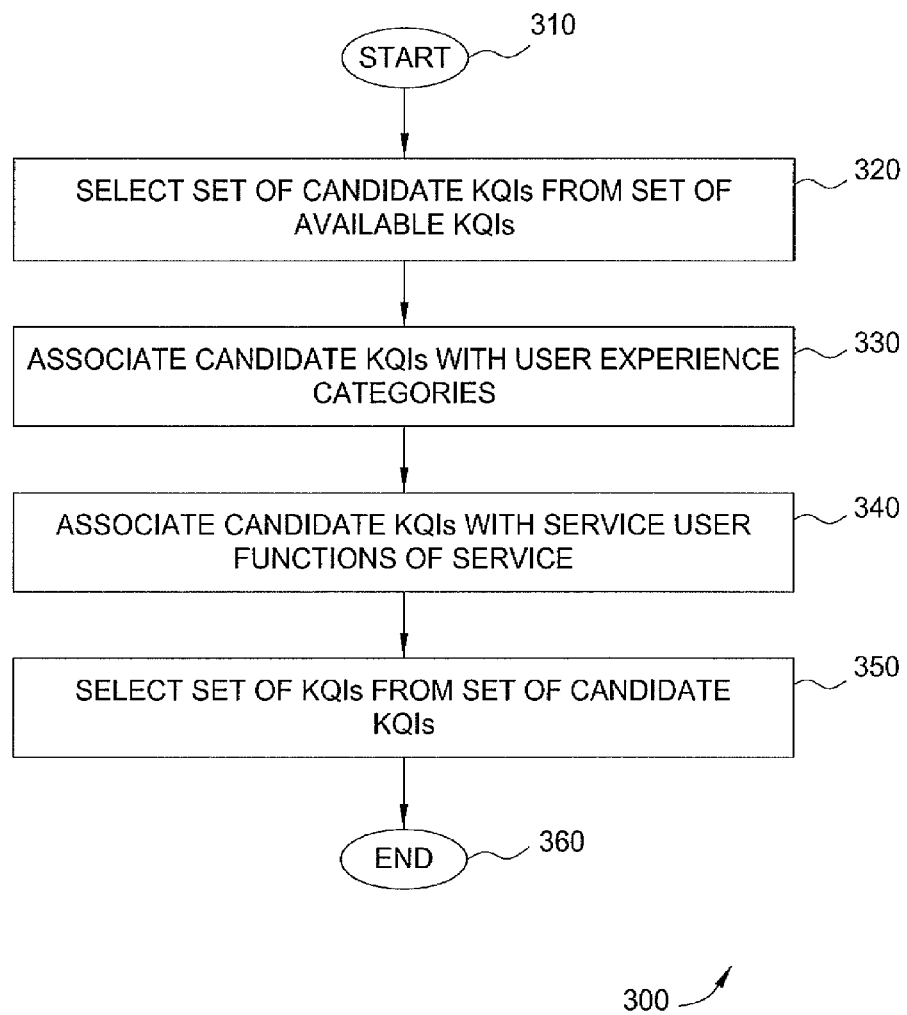
FIG. 3 depicts one embodiment of a method for selecting a set of KQIs for a service from a set of available KQIs.

FIG. 3 depicts one embodiment of a method for selecting a set of KQIs for a service from a set of available KQIs. Although depicted and described as being performed serially, at least a portion of the steps of method 300 may be performed contemporaneously and/or in a different order than presented in FIG. 3.

At step 310, method 300 begins.

At step 320, a set of candidate KQIs is selected from a set of available KQIs. The set of available KQIs may include each of the KQIs defined in the KQI description data. The set of candidate KQIs may include any of the available KQIs associated with the service. In one embodiment, the set of candidate KQIs associated with the service is identified using a Service Name of the service. In one embodiment, the set of candidate KQIs associated with the service is identified by determining the Service Name of the service from the service provider offered service and performance data and searching the KQI description data in order to identify KQIs having associated Service Names matching the Service Name of the service determined from the service provider offered service and performance data. This matching may be better understood by way of reference to Tables 2A and 2B (which illustrate that KQI has a Service Name associated therewith) and Tables 3A and 3B (which illustrate that each service description has a Service Name associated therewith). In one embodiment, one or more additional rules also may be applied for checking one or more additional fields in addition to the Service Name field (e.g., checking for matching of Service Type fields in the service provider offered service and performance data and the KQI description data, checking for matching of Service Sub-Type fields in the service provider offered service and performance data and the KQI description data, or the like, as well as various combinations thereof). In one embodiment, text processing rules also may be applied to ensure reliable matching in the presence of text-based anomalies (e.g., spelling errors) when identifying the set of candidate KQIs.

At step 330, the candidate KQIs are associated with user experience categories, such that each of the candidate KQIs is associated with one of the user experience categories.

In one embodiment, the candidate KQIs may be associated with user experience categories based on user experience metadata.

In one embodiment, a candidate KQI is associated with one of the user experience categories by using user experience keywords associated with the candidate KQI (e.g., determined from the User Experience Keywords field of the KQI description of the candidate KQI in the KQI description data) to search the user experience keywords associated with the user experience categories (e.g., determined from the User Experience Keywords field of the user experience metadata). In this embodiment, the candidate KQI is associated with one of the user experience categories having user experience keywords (e.g., in the user experience metadata) that most closely match the user experience keywords (in the KQI description data) of the candidate KQI.

In one embodiment, the user experience metadata may be enhanced in conjunction with association of the candidate KQIs with the user experience categories. As described above, for example, user experience metadata maintenance rules may provide a mechanism for handling user experience keywords that are discovered in the KQI description data but which are not present in the user experience metadata table to be reported for enabling the user experience keywords to be added to the user experience metadata.

At step 340, the candidate KQIs are associated with service user functions of the service, such that each of the candidate KQIs is associated with one of the service user functions of the service.

In one embodiment, a candidate KQI is associated with a service user function of the service using rule-based analysis.

In one embodiment, a candidate KQI is associated with a service user function of the service by comparing KQI description information of the candidate KQI (e.g., from the KQI description of the candidate KQI in the KQI description data) with corresponding information from the service provider offered service and performance data.

In one embodiment, a candidate KQI is evaluated with respect to one or more of the service user functions until the service user function with which the candidate KQI is associated is identified. In one such embodiment, for each service user function against which the candidate KQI is evaluated, the KQI Formula field and the User Experience Keywords field for the candidate KQI in the KQI description data are compared to the Service User Functions and the User Function Execution Domain Keywords in the service user function data for the service user function being evaluated. It is noted that the Service User Function Execution Domain keywords include keywords that refer to types of user actions that may be associated with a KQI candidate. An exemplary process for associating each of the candidate KQIs with service user functions of the service is depicted and described with respect to FIG. 4.

Table 6A depicts exemplary KQI description information of a candidate KQI and corresponding information from the service provider offered service and performance data which may be compared for associating the candidate KQI with a service user function.

TABLE 6A

| KQI Description Data | | | | | Service Provider Offered Services and Performance Data (Service User Functions Data) | |
|---|---|---|---|---|---|---|
| KQI ID | Service Name | KQI Formula | Meas. Units | User Experience Keywords | Service User Function | User Function Execution Domain Keywords |

Table 6B depicts exemplary KQI description information of an exemplary candidate KQI and corresponding information from the service provider offered service and performance data which may be compared for associating the exemplary candidate KQI with a service user function.

TABLE 6B

| KQI ID | Service Name | KQI Formula | Meas. Units | KQI Description Data — User Experience Keywords | Service Provider Offered Services and Performance Data (Service User Functions Data) — Service User Function | User Function Execution Domain Keywords |
|---|---|---|---|---|---|---|
| 19 | E-Mail | Email Send Success = (unsuccessful send attempts/ all send attempts × 100) | % | send email, send message, successfully send . . . | Send Message | email protocol, email server, email application, transmit, transmission, upload |

Figure 4:
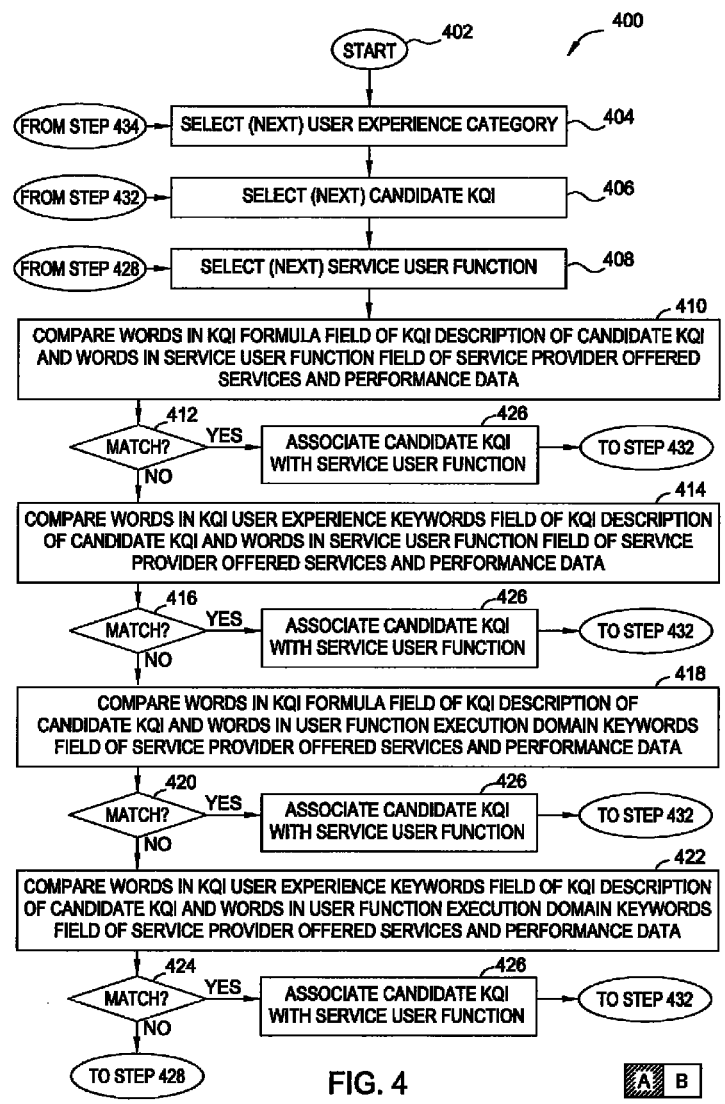
FIG. 4 depicts one embodiment of a method for associating candidate KQIs with service user functions of the service.
Figure 4:
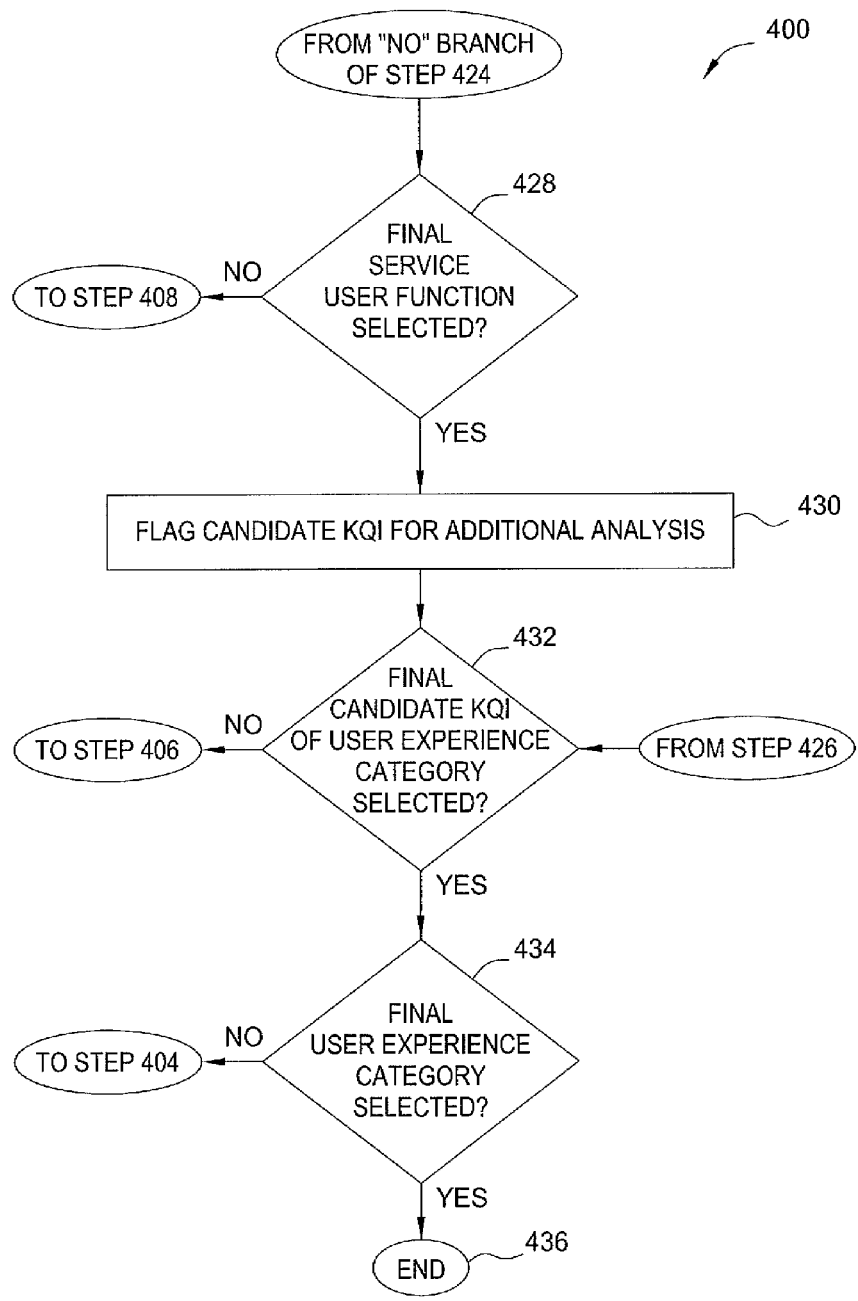

FIG. 4 depicts one embodiment of a method for associating candidate KQIs with service user functions of the service. Although depicted and described as being performed serially, at least a portion of the steps of method 400 may be performed contemporaneously and/or in a different order than presented in FIG. 4.

At step 402, method 400 begins.

At step 404, a (next) user experience category is selected. This enables each of the user experience categories to be considered for associating candidate KQIs with service user functions of the service.

At step 406, a (next) candidate KQI of the selected user experience category is selected. This enables each of the candidate KQIs associated with each selected user experience category to be considered for associating the candidate KQIs with service user functions of the service.

At step 408, a (next) service user function is selected. This enables cycling through the available service user categories until the service user category with which the candidate KQI is associated is identified.

At step 410, words in the KQI Formula field of the KQI description of the candidate KQI are compared to words in the Service User Function field of the service provider offered services and performance data.

At step 412, a determination is made as to whether a match is found. If a match is found, method 400 proceeds to step 426 where the candidate KQI is associated with the service user function. If a match is not found, method 400 proceeds to step 414.

At step 414, words in the KQI User Experience Keywords field of the KQI description of the candidate KQI are compared to words in the Service User Function field of the service provider offered services and performance data.

At step 416, a determination is made as to whether a match is found. If a match is found, method 400 proceeds to step 426 where the candidate KQI is associated with the service user function. If a match is not found, method 400 proceeds to step 418.

At step 418, words in the KQI Formula field of the KQI description of the candidate KQI are compared to words in the User Function Execution Domain Keywords field of the service provider offered services and performance data.

At step 420, a determination is made as to whether a match is found. If a match is found, method 400 proceeds to step 426 where the candidate KQI is associated with the service user function. If a match is not found, method 400 proceeds to step 422.

At step 422, words in the KQI User Experience Keywords field of the KQI description of the candidate KQI are compared to words in the User Function Execution Domain Keywords field of the service provider offered services and performance data.

At step 424, a determination is made as to whether a match is found. If a match is found, method 400 proceeds to step 426 where the candidate KQI is associated with the service user function. If a match is not found, method 400 proceeds to step 428.

At step 426, as described above, the candidate KQI is associated with the service user function. From step 426, method 400 proceeds to step 432.

At step 428, a determination is made as to whether the final service user function has been selected. If the final service user function has not been selected, method 400 returns to step 408 where a next service user function is selected for evaluation. If the final service user function has been selected, method 400 proceeds to step 430.

At step 430, the candidate KQI is flagged for additional analysis for determining a user experience category with which the candidate KQI is associated. The additional analysis may include automated and/or manual analysis of the candidate KQI (and/or one or more of the available service user functions) to determine whether or not it is possible to associate the candidate KQI with one of the available service user functions and, if possible, to identify which of the available service user functions with which the candidate KQI should be associated.

From step 430, method 400 proceeds to step 432.

At step 432, a determination is made as to whether the final candidate KQI of the user experience category has been selected. If the final candidate KQI of the user experience category has not been selected, method 400 returns to step 406 where a next candidate KQI of the user experience category is selected for evaluation. If the final candidate KQI of the user experience category has been selected, method 400 proceeds to step 434.

At step 434, a determination is made as to whether the final user experience category has been selected. If the final user experience category has not been selected, method 400 returns to step 404 where a next user experience category is selected for evaluation. If the final user experience category has been selected, method 400 proceeds to step 436.

At step 436, method 400 ends.

Returning now to FIG. 3, it is noted that the result of steps 330 and 340 of method 300 is that each candidate KQI is associated with a combination of a user experience category and a service user function. This result may be represented in any suitable manner. In one embodiment, this result may be represented as a two-dimensional matrix, with user experience categories being columns of the matrix and service user functions being rows of the matrix (or vice versa), such that each cell of the two-dimensional matrix represents a combination of a user experience category and a service user function. This matrix is referred to herein as a candidate KQI mapping matrix. In the candidate KQI mapping matrix, each candidate KQI is mapped to one of the cells of the candidate KQI mapping matrix and each cell of the candidate KQI mapping matrix includes zero or more candidate KQIs.

Table 7A depicts an exemplary candidate KQI mapping matrix for associating candidate KQIs with user experience categories and service user functions.

TABLE 7A

| Service User Functions | User Experience Categories | | | |
| --- | --- | --- | --- | --- |
| | User Experience Category 1 | User Experience Category 2 | User Experience Category 3 | User Experience Category 4 |
| Service User Function 1 | | | | |
| Service User Function 2 | | | | |
| Service User Function 3 | | | | |

Table 7B depicts an exemplary association of four candidate KQIs with user experience categories and service user functions using the exemplary candidate KQI mapping matrix of Table 7A.

TABLE 7B

| Service User Functions | User Experience Categories | | | |
| --- | --- | --- | --- | --- |
| | Accessibility | Responsiveness | Integrity | Retainability |
| Write New Message | | | KQI-43 | |
| Send Message | KQI-19 | | | |
| Receive Notification of Message Sent | | | | |
| Receive Email | | KQI-20 | | |
| View Received Email | | | | KQI-15 |

At step 350, candidate KQIs are selected for inclusion in a set of selected KQIs associated with the service, where the set of selected KQIs for the service may include some of the candidate KQIs or all of the candidate KQIs.

In one embodiment, the selection of candidate KQIs for inclusion in the set of selected KQIs may be based on case-based logic applied based on the candidate KQI mapping matrix.

In one embodiment, the case-based logic that is applied to select the candidate KQIs for inclusion in the set of selected KQIs is based on the numbers of candidate KQIs included within the cells of the candidate KQI mapping matrix, respectively. In this embodiment, each cell of the candidate KQI mapping matrix may be evaluated for determining which of the candidate KQIs of that cell (if there are any) are selected for inclusion in the set of selected KQIs. In this embodiment, different actions may be taken for three different cases in which the cell of the candidate KQI mapping matrix includes zero candidate KQIs (first case), one candidate KQI (second case), and more than one candidate KQI (third case). An exemplary embodiment is depicted and described with respect to FIG. 5.

Figure 5:
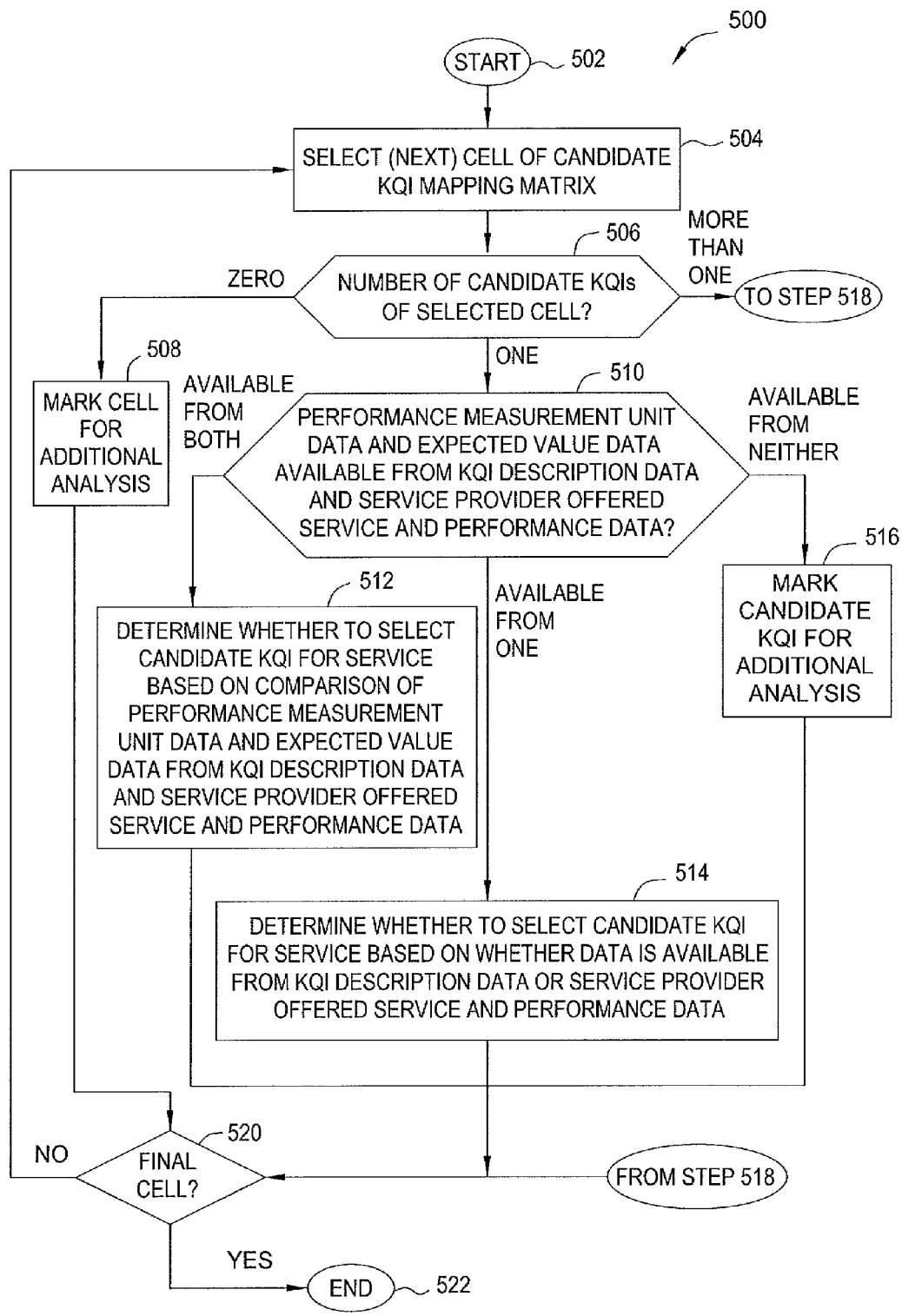
FIG. 5 depicts one embodiment of a method for using case-based logic to determine the set of selected KQIs for the service.

FIG. 5 depicts one embodiment of a method for using case-based logic to determine the set of selected KQIs for the service. Although depicted and described as being performed serially, at least a portion of the steps of method 500 may be performed contemporaneously and/or in a different order than presented in FIG. 5.

At step 502, method 500 begins.

At step 504, a cell of the candidate KQI mapping matrix is selected.

At step 506, a determination is made as to whether the selected cell of the candidate KQI mapping matrix includes zero, one, or more than one candidate KQI. If the selected cell of the candidate KQI mapping matrix does not include any candidate KQIs, the method 500 proceeds to step 508. If the selected cell of the candidate KQI mapping matrix includes only one candidate KQI, the method 500 proceeds to step 510 (for further evaluation of the candidate KQI to determine whether or not the candidate KQI is selected for inclusion in the set of selected KQIs). If the selected cell of the candidate KQI mapping matrix includes more than one candidate KQI, the method 500 proceeds to step 516 (for further evaluation of the candidate KQIs, using case-based logic, to determine which of the candidate KQIs are selected for inclusion in the set of selected KQIs).

At step 508, the selected cell of the candidate KQI mapping matrix is marked for additional analysis. The additional analysis may include automated and/or manual analysis of the selected cell of the candidate KQI mapping matrix (and/or one or more of the candidate KQIs) to determine whether or not any of the candidate KQIs should be mapped to the selected cell of the candidate KQI mapping matrix. From step 508, the method 500 proceeds to step 520.

At step 510, a determination is made as to whether performance measurement unit data and expected value data is available from KQI description data of the candidate KQI and service provider offered service and performance data. If performance measurement unit data and expected value data is available from both the KQI description data of the candidate KQI and the service provider offered service and performance data, the method 500 proceeds to step 512. If performance measurement unit data and expected value data is available from one or the other of the KQI description data of the candidate KQI and the service provider offered service and performance data, method 500 proceeds to step 514. If performance measurement unit data and expected value data is available from neither the KQI description data of the candidate KQI nor the service provider offered service and performance data, method 500 proceeds to step 516.

At step 512, a determination as to whether or not the candidate KQI is selected for inclusion in the set of selected KQIs is made based on a comparison of the performance measurement unit data and the expected value data available from the KQI description data of the candidate KQI and the service provider offered service and performance data. In one embodiment, if comparison of the performance measurement unit data and the expected value data available from the KQI description data of the candidate KQI and the service provider offered service and performance data indicates that a condition is satisfied, the candidate KQI is selected for inclusion in the set of selected KQIs, otherwise the candidate KQI is not selected for inclusion in the set of selected KQIs. The condition may be any suitable type of condition related to comparison of the performance measurement unit data and the expected value data available from the KQI description data of the candidate KQI and the service provider offered service and performance data. In one embodiment, the condition is whether or not the performance values are within a certain percentage of each other. In one embodiment, if the performance values are within a certain percentage of each other (e.g., 15%, 25%, or the like), the candidate KQI is selected for inclusion in the set of selected KQIs, otherwise the candidate KQI is not selected for inclusion in the set of selected KQIs. It is noted that other types of conditions also may be used for determining whether or not the candidate KQI is selected for inclusion in the set of selected KQIs. From step 512, method 500 proceeds to step 520.

At step 514, a determination as to whether or not the candidate KQI is selected for inclusion in the set of selected KQIs is made based on whether the performance measurement unit data and the expected value data are available from the KQI description data of the candidate KQI or the service provider offered service and performance data. If the performance measurement unit data and the expected value data is available from the KQI description data of the candidate KQI but is not available from the service provider offered service and performance data, the candidate KQI is not selected for inclusion in the set of selected KQIs. If the performance measurement unit data and the expected value data is not available from the KQI description data of the candidate KQI but is available from the service provider offered service and performance data, the candidate KQI is selected for inclusion in the set of selected KQIs. From step 514, method 500 proceeds to step 520.

At step 516, the candidate KQI is marked for additional evaluation (i.e., the candidate KQI is not selected for inclusion in the set of selected KQIs at this time, but may be added to the set of selected KQIs if the additional evaluation results in such a determination). The additional analysis may include automated and/or manual analysis of the candidate KQI (and any relevant information associated with the candidate KQI) to determine whether or not the candidate KQI is selected for inclusion in the set of selected KQIs. From step 516, method 500 proceeds to step 520.

At step 518, a determination as to whether or not the candidate KQIs are selected for inclusion in the set of selected KQIs is made based on processing to remove duplicate candidate KQIs from the selected cell.

In one embodiment, any candidate KQIs remaining in the cell after the processing to remove duplicate candidate KQIs may be selected for inclusion in the set of selected KQIs, while the duplicate candidate KQIs removed from the cell are not selected for inclusion in the set of selected KQIs.

In one embodiment, the determination as to whether or not the candidate KQIs are selected for inclusion in the set of selected KQIs includes (1) selecting a candidate KQI from the cell and comparing the candidate KQI selected from the cell to each of the other candidate KQIs of the cell in order to determine if the candidate KQI selected from the cell is a duplicate, (2) selecting the candidate KQI for inclusion in the set of selected KQIs if the candidate KQI is not a duplicate within the selected cell (and removing the candidate KQI from the cell or at least marking it in a way such that it is not selected for evaluation again), otherwise removing the candidate KQI from the cell if the candidate KQI is a duplicate within the selected cell (or at least marking it in a way such that it is not selected for evaluation again), and (3) repeating steps (1) and (2) until all candidate KQIs in the selected cell have been evaluated.

In one embodiment, the determination as to whether or not the candidate KQI is a duplicate within the selected cell of the candidate KQI mapping matrix may be made by comparing the KQI Formula data element of the KQI description data of the selected candidate KQI to the KQI Formula data element(s) of the KQI description data of any candidate KQIs still remaining in the selected cell of the candidate KQI mapping matrix, where an identification of a match in the compared KQI Formula data elements indicates that the selected candidate KQI is a duplicate and failure to identify a match in the compared KQI Formula data elements indicates that the selected candidate KQI is not a duplicate.

From step 518, method 500 proceeds to step 520.

At step 520, a determination is made as to whether the final cell of the candidate KQI mapping matrix has been selected. If the final cell of the candidate KQI mapping matrix has not been selected, method 500 returns to step 504 (at which point the next cell of the candidate KQI mapping matrix is selected). If the final cell of the candidate KQI mapping matrix has been selected, method 500 proceeds to step 522.

At step 522, method 500 ends.

It is noted that evaluation of the candidate KQIs by selecting and evaluating each cell of the candidate KQI mapping matrix also may be considered to be evaluation of the candidate KQIs by selecting and evaluating each combination of user experience category and service user function as the cells of the candidate KQI mapping matrix represent combinations of the available user experience categories and the available service user functions.

It is noted that method 500 represents one way in which the candidate KQIs may be evaluated for determining which of the candidate KQIs are selected for the service. It is noted that, although primarily described with respect to an embodiment in which the candidate KQIs are evaluated by selecting and evaluating each cell of the candidate KQI mapping matrix (as depicted and described with respect to FIG. 5), in one embodiment the candidate KQIs may be evaluated by selecting and evaluating each candidate KQI as follows: (1) where the candidate KQI selected for evaluation is the only candidate KQI associated with that combination of user experience category and service user function, using the logic of steps 510-514 of method 500 to determine whether or not to select the candidate KQI for the service and (2) where the candidate KQI selected for evaluation is the one of multiple candidate KQIs associated with that combination of user experience category and service user function, using the logic of step 518 of method 500 to determine whether or not to select the candidate KQI for the service.

It is noted that, although primarily depicted and described with respect to use of specific types of case-based logic to select candidate KQIs for inclusion in the set of selected KQIs (e.g., cases based on the number of candidate KQIs included in cells of the candidate KQI mapping matrix, cases based on the types of data available for evaluation, and the like), other types of case-based logic may be used to select candidate KQIs for inclusion in the set of selected KQIs.

Returning again to FIG. 3, it is noted that the result step 350 of method 300 is that the set of selected KQIs has been determined.

The set of selected KQIs may be used in any suitable manner. For example, where the SP is managing the service itself, the set of selected KQIs may be used by the SP to manage the service. For example, where the SP contracts with an MSP to have the MSP manage the service on behalf of the SP, the set of selected KQIs may be used by the MSP during negotiations with the SP. It is noted that the selected KQIs may be used in any other suitable types of provider-client relationships related to management of services available from a communication network.

At step 360, method 300 ends.

Although primarily depicted and described as ending (for purposes of clarity), it is noted that method 300 may be repeated for one or more other services to be managed. The selection of the next service for which method 300 is executed may be performed manually or automatically. The next service for which method 300 is executed may be selected based on a list of services for which KQIs are to be selected. The next service for which method 300 is executed may be selected using the service provider offered service and performance data. Accordingly, the method 300 may be repeated any suitable number of times for any suitable number of services.

Figure 6:
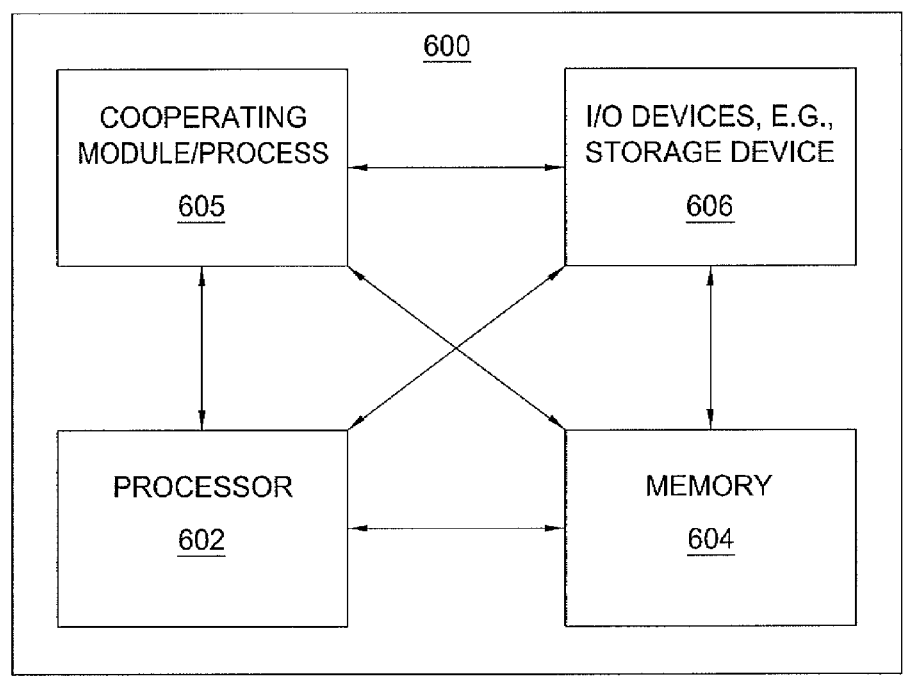
FIG. 6 depicts a high-level block diagram of a computer suitable for use in performing functions described herein.

FIG. 6 depicts a high-level block diagram of a computer suitable for use in performing functions described herein.

The computer 600 includes a processor element 602 (e.g., a central processing unit (CPU) and/or other suitable processor(s)) and a memory 604 (e.g., random access memory (RAM), read only memory (ROM), or the like). The computer 600 also may include a cooperating module/process 605. The cooperating process 605 can be loaded into memory 604 and executed by the processor 602 to implement functions as discussed herein and, thus, cooperating process 605 (including associated data structures) can be stored on a computer readable storage medium, e.g., RAM memory, magnetic or optical drive or diskette, or the like. The computer 600 also may include various input/output devices 606 (e.g., a user input device (such as a keyboard, a keypad, a mouse, or the like), a user output device (such as a display, a speaker, or the like), an input port, an output port, a receiver, a transmitter, and storage devices (e.g., a tape drive, a floppy drive, a hard disk drive, a compact disk drive, or the like)).

It will be appreciated that computer 600 depicted in FIG. 6 provides a general architecture and functionality suitable for implementing functional elements described herein and/or portions of functional elements described herein. For example, the computer 600 provides a general architecture and functionality suitable for use in implementing one or more of an EUD 102, a portion of an EUD 102, a communication element 112, a portion of a communication element 112, a monitoring element 114, a portion of a monitoring element 114, a management system 116, a portion of a management system 116, the KSS 120, a portion of the KSS 120, and so forth.

It will be appreciated that the functions depicted and described herein may be implemented in software (e.g., via implementation of software on one or more processors, for executing on a general purpose computer (e.g., via execution by one or more processors) so as to implement a special purpose computer, or the like) and/or may be implemented in hardware (e.g., using a general purpose computer, one or more application specific integrated circuits (ASIC), and/or any other hardware equivalents).

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus, comprising:
a processor and a memory communicatively connected to the processor, the processor configured to:
 select a plurality of candidate service quality metrics for a service from a set of available service quality metrics, wherein, to select the plurality of candidate service quality metrics from the set of available service quality metrics, the processor is configured to:
  determine a service name of the service; and
  for each of the available service quality metrics of the set of available service quality metrics:
   determine whether a respective service name of the available service quality metric matches the service name of the service; and
   identify the available service quality metric as one of the plurality of candidate service quality metrics when the respective service name of the available service quality metric matches the service name of the service;
 generate mapping information comprising, for each of the candidate service quality metrics of the plurality of candidate service quality metrics, a respective association of the candidate service quality metric with a combination of one of a plurality of user experience categories and one of a plurality of service user functions of the service; and
 select at least a portion of the plurality of candidate service quality metrics, based on the mapping information, for association with the service.

2. The apparatus of claim 1, wherein the processor is configured to:
 select the service from a plurality of services offered by a Service Provider.

3. The apparatus of claim 1, wherein the service name of the service quality metric is determined from service quality metric description information associated with the service quality metric.

4. The apparatus of claim 1, wherein the processor is configured to:
 for at least one of the plurality of candidate service quality metrics:
  select a first service user function of the plurality of service user functions, the first service user function having service user function data associated therewith;
  perform a comparison to compare the service user function data of the first service user function with service quality metric description data associated with a respective candidate service quality metric;
  in response to a determination that a match is identified based on the comparison, associate the respective candidate service quality metric with the first service user function; and
  in response to a determination that a match is not identified based on the comparison, select a second service user function of the plurality of service user functions.

5. An apparatus, comprising:
a processor and a memory communicatively connected to the processor, the processor configured to:
 select a plurality of candidate service quality metrics for a service from a set of available service quality metrics;
 generate mapping information comprising, for each of the candidate service quality metrics of the plurality of candidate service quality metrics, a respective association of the candidate service quality metric with a combination of one of a plurality of user experience categories and one of a plurality of service user functions of the service, wherein the processor is configured to, for at least one of the candidate service quality metrics, associate the candidate service quality metric with the one of the plurality of user experience categories based on user experience metadata defining mappings between the user experience categories and respective pluralities of user experience keywords, wherein the user experience keywords are determined from service quality metrics description information associated with the available service quality metrics; and
    select at least a portion of the plurality of candidate service quality metrics, based on the mapping information, for association with the service.
6. An apparatus, comprising:
a processor and a memory communicatively connected to the processor, the processor configured to:
    select a plurality of candidate service quality metrics for a service from a set of available service quality metrics;
    generate mapping information comprising, for each of the candidate service quality metrics of the plurality of candidate service quality metrics, a respective association of the candidate service quality metric with a combination of one of a plurality of user experience categories and one of a plurality of service user functions of the service, wherein the processor is configured to, for at least one of the candidate service quality metrics of the plurality of candidate service quality metrics, associate the candidate service quality metric with the one of the plurality of service user functions of the service based on a comparison of at least one word of service user function data with at least one word of a service quality metric description of the at least one of the candidate service quality metrics of the plurality of candidate service quality metrics; and
    select at least a portion of the plurality of candidate service quality metrics, based on the mapping information, for association with the service.
7. The apparatus of claim 6, wherein the processor is configured to:
    in response to identification of a match for the one of the plurality of service user functions of the service based on the comparison of the at least one word of the service user function data with the at least one word of the service quality metric description of the candidate service quality metric, associate the candidate service quality metric with the one of the service user functions.
8. The apparatus of claim 6, wherein:
the at least one word of the service user function data comprises at least one of a word of a service user function field or a word of a user function execution domain keyword field; and
the at least one word of the service quality metric description of the candidate service quality metric comprises at least one of a word of a service quality metric formula field defining a formula for computing a value of the candidate service quality metric or a word of a user experience keywords field including at least one user experience keyword associated with the candidate service quality metric.
9. An apparatus, comprising:
a processor and a memory communicatively connected to the processor, the processor configured to:

select a plurality of candidate service quality metrics for a service from a set of available service quality metrics;
    generate mapping information comprising, for each of the candidate service quality metrics of the plurality of candidate service quality metrics, a respective association of the candidate service quality metric with a combination of one of a plurality of user experience categories and one of a plurality of service user functions of the service, wherein, to generate the respective association of the candidate service quality metric with one of the service user functions, the processor is configured to:
        perform a comparison to compare one or more words from a Service User Function field of the service user function with one or more words from a service quality metric Formula field of a service quality metric description of the candidate service quality metric; and
        in response to a determination that a match is identified based on the comparison, associate the candidate service quality metric with the one of the service user functions; and
    select at least a portion of the plurality of candidate service quality metrics, based on the mapping information, for association with the service.
10. The apparatus of claim 9, wherein, to generate the respective association of the candidate service quality metric with one of the service user functions, the processor is configured to:
    in response to a determination that a match is not identified based on the comparison, perform a second comparison to compare one or more words from a Service User Function field of the service user function with one or more words from a service quality metric User Experience Keywords field of the service quality metric description of the candidate service quality metric; and
    in response to a determination that a second match is identified based on the second comparison, associate the candidate service quality metric with the one of the service user functions.
11. The apparatus of claim 10, wherein, to generate the respective association of the candidate service quality metric with one of the service user functions, the processor is configured to:
    in response to a determination that a second match is not identified based on the second comparison, perform a third comparison to compare one or more words from a User Function Execution Domain Keywords field of the service user function with one or more words from a service quality metric Formula field of the service quality metric description of the candidate service quality metric; and
    in response to a determination that a third match is identified based on the third comparison, associate the candidate service quality metric with the one of the service user functions.
12. The apparatus of claim 11, wherein, to generate the respective association of the candidate service quality metric with one of the service user functions, the processor is configured to:
    in response to a determination that a third match is not identified based on the third comparison, perform a fourth comparison to compare one or more words from a User Function Execution Domain Keywords field of the service user function with one or more words from a service quality metric User Experience Keywords field of the service quality metric description of the candidate service quality metric; and in response to a determination that a fourth match is identified based on the fourth comparison, associate the candidate service quality metric with one of the service user functions.

13. An apparatus, comprising:
a processor and a memory communicatively connected to the processor, the processor configured to:
   select a plurality of candidate service quality metrics for a service from a set of available service quality metrics;
   generate mapping information comprising, for each of the candidate service quality metrics of the set of available service quality metrics, a respective association of the candidate service quality metric with a combination of one of a plurality of user experience categories and one of a plurality of service user functions of the service; and
   select at least a portion of the candidate service quality metrics, based on the mapping information, for association with the service, wherein the processor is configured to determine whether to select one of the plurality of candidate service quality metrics for association with the service using case-based logic based on a number of candidate service quality metrics associated with a combination of the one of the user experience categories and the one of the service user functions with which the one of the plurality of candidate service quality metrics is associated, wherein the processor is configured to, in response to a determination that the one of the plurality of candidate service quality metrics is the only one of the plurality of candidate service quality metrics associated with the combination of the one of the user experience categories and the one of the service user functions, apply case-based logic based on availability of at least one type of data from service quality metric description data associated with the one of the service quality metrics and from service provider offered service and performance data.

14. The apparatus of claim 13, wherein the at least one type of data comprises performance measurement unit data and expected value data.

15. The apparatus of claim 13, wherein the processor is configured to:
   in response to a determination that the type of data is available from both the service quality metric description data and the service provider offered service and performance data, determine whether to select the one of the plurality of candidate service quality metrics for association with the service based on a comparison of the service quality metric description data and the service provider offered service and performance data;
   in response to a determination that the type of data is available from the service quality metric description data and is unavailable from the service provider offered service and performance data, prevent selection of the one of the plurality of candidate service quality metrics for association with the service;
   in response to a determination that the type of data is unavailable from the service quality metric description data and is available from the service provider offered service and performance data, select the one of the plurality of candidate service quality metrics for association with the service; and
   in response to a determination that the type of data is unavailable from the service quality metric description data associated with the one of the service quality metrics and is unavailable from the service provider offered service and performance data, prevent selection of the one of the plurality of candidate service quality metrics for association with the service.

16. The apparatus of claim 13, wherein the processor is configured to:
   in response to a determination that the one of the plurality of candidate service quality metrics is one of a plurality of the candidate service quality metrics associated with the combination of the one of the user experience categories and the one of the service user functions:
      determine whether the one of the plurality of candidate service quality metrics is a duplicate within the plurality of candidate service quality metrics associated with the combination of the one of the user experience categories and the one of the service user functions; and
   in response to a determination that the one of the plurality of candidate service quality metrics is not a duplicate within the plurality of candidate service quality metrics associated with the combination of the one of the user experience categories and the one of the service user functions, select the one of the plurality of candidate service quality metrics for association with the service.

17. A method, comprising:
using at least one processor for:
   selecting a plurality of candidate service quality metrics for a service from a set of available service quality metrics, wherein selecting the plurality of candidate service quality metrics from the set of available service quality metrics comprises:
      determining a service name of the service; and
      for each of the available service quality metrics of the set of available service quality metrics:
         determining whether a respective service name of the available service quality metric matches the service name of the service; and
         identifying the available service quality metric as one of the plurality of candidate service quality metrics when the respective service name of the available service quality metric matches the service name of the service;
   generating mapping information comprising, for each of the candidate service quality metrics of the plurality of candidate service quality metrics, a respective association of the candidate service quality metric with a combination of one of a plurality of user experience categories and one of a plurality of service user functions of the service; and
   selecting at least a portion of the plurality of candidate service quality metrics, based on the mapping information, for association with the service.

* * * * *